(12) United States Patent
Donovan et al.

(10) Patent No.: US 12,400,159 B2
(45) Date of Patent: Aug. 26, 2025

(54) DELEGATION OF TASKS IN AN ENTERPRISE ENVIRONMENT

(71) Applicant: ADP, Inc., Roseland, NJ (US)

(72) Inventors: William Randall Donovan, Brooklyn, NY (US); Nicholas Heasman, Sarasota, FL (US); Prasannakumar Palanikumar, New York, NY (US)

(73) Assignee: ADP, Inc., Roseland, NJ (US)

( * ) Notice: Subject to any disclaimer, the term of this patent is extended or adjusted under 35 U.S.C. 154(b) by 186 days.

(21) Appl. No.: 18/057,046

(22) Filed: Nov. 18, 2022

(65) Prior Publication Data

US 2024/0169289 A1 May 23, 2024

(51) Int. Cl.
*G06Q 10/00* (2023.01)
*G06Q 10/0631* (2023.01)
*G06Q 10/1057* (2023.01)

(52) U.S. Cl.
CPC ... *G06Q 10/06312* (2013.01); *G06Q 10/1057* (2013.01)

(58) Field of Classification Search
None
See application file for complete search history.

(56) References Cited

U.S. PATENT DOCUMENTS

| | | | | |
|---|---|---|---|---|
| 2009/0064280 A1* | 3/2009 | Babeanu | ............... | G06Q 10/06 726/3 |
| 2015/0220649 A1* | 8/2015 | Papa | ................ | G06F 16/9535 707/722 |
| 2015/0269854 A1* | 9/2015 | Maharaj | ................ | G09B 5/08 434/353 |
| 2016/0155135 A1* | 6/2016 | Papa | ............. | G06Q 40/04 726/28 |
| 2016/0292601 A1* | 10/2016 | Pakanathi | ............. | H04L 63/101 |
| 2018/0075413 A1* | 3/2018 | Culver | ................. | G06Q 10/103 |
| 2018/0129995 A1* | 5/2018 | Fowler | ................. | G06F 3/0482 |
| 2019/0213528 A1* | 7/2019 | Gupta | .................... | G06Q 10/10 |
| 2019/0259038 A1* | 8/2019 | Papa | ....................... | G06F 21/62 |
| 2020/0394595 A1* | 12/2020 | Fowler | ............. | G06Q 10/06312 |
| 2020/0410133 A1* | 12/2020 | Barday | ................... | H04L 63/20 |
| 2023/0071115 A1* | 3/2023 | Matsuoka | ......... | G06Q 10/06316 |
| 2023/0090862 A1* | 3/2023 | Cupersmith | ........... | B25J 11/008 701/2 |
| 2023/0169440 A1* | 6/2023 | VanBuskirk | ........ | H04L 12/4625 705/7.42 |
| 2024/0086859 A1* | 3/2024 | Gillam | ............... | G06Q 10/1095 |

OTHER PUBLICATIONS

Managing App Approval for Your Workspace, Sep. 8, 2016, Slack, https://slack.com/help/articles/222386767-Manage-app-approval-for-your-workspace, p. 1-5. (Year: 2016).*

* cited by examiner

Primary Examiner — Joseph M Waesco
(74) Attorney, Agent, or Firm — Foley & Lardner LLP

(57) ABSTRACT

Disclosed are various embodiments for delegating tasks in an enterprise service. A user can associate an action or task within the enterprise service with a delegate. The user can also specify temporal restrictions with the delegation of the task. The temporal restrictions specified time limitations on the authority of the delegate.

17 Claims, 8 Drawing Sheets

Browser

File  Edit  View  Bookmarks  Tools  Help http://www.company.com/Jane_Doe/update

Delegates

Your Delegates

John Doe

| Start Date | End Date | Delegated Item(s) |
|---|---|---|
| 10/2/2022 | 10/9/2022 | Vacation Request, Compensation Change |

Edit

Mary Doe

| Start Date | End Date | |
|---|---|---|
| 9/13/2022 | none | Vacation Request, Expense Reimbursement |

Edit

Add Delegate

FIG. 3A

DELEGATION OF TASKS IN AN ENTERPRISE ENVIRONMENT

BACKGROUND

In an enterprise environment, certain users can be tasked with approving or denying requests of various types. For example, a user in a managerial or supervisory role can be tasked with approving or denying requests for vacation from workers associated with the enterprise. As another example, a user can be tasked with approving or denying requests for changes to the compensation of workers in the enterprise. As yet another example, a user can be tasked with approving or denying requests for reimbursement of expense report for workers associated with the enterprise. Accordingly, certain users associated with an enterprise can be tasked with all manner of requests for approval or denial of requests from or on behalf of other users in the enterprise. If a user in this role is unavailable to approve or deny requests, these requests can cause delays or other issues within the organization.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 3A-3D illustrate example user interfaces according to various embodiments of the present disclosure.

DETAILED DESCRIPTION

Figure 1A:
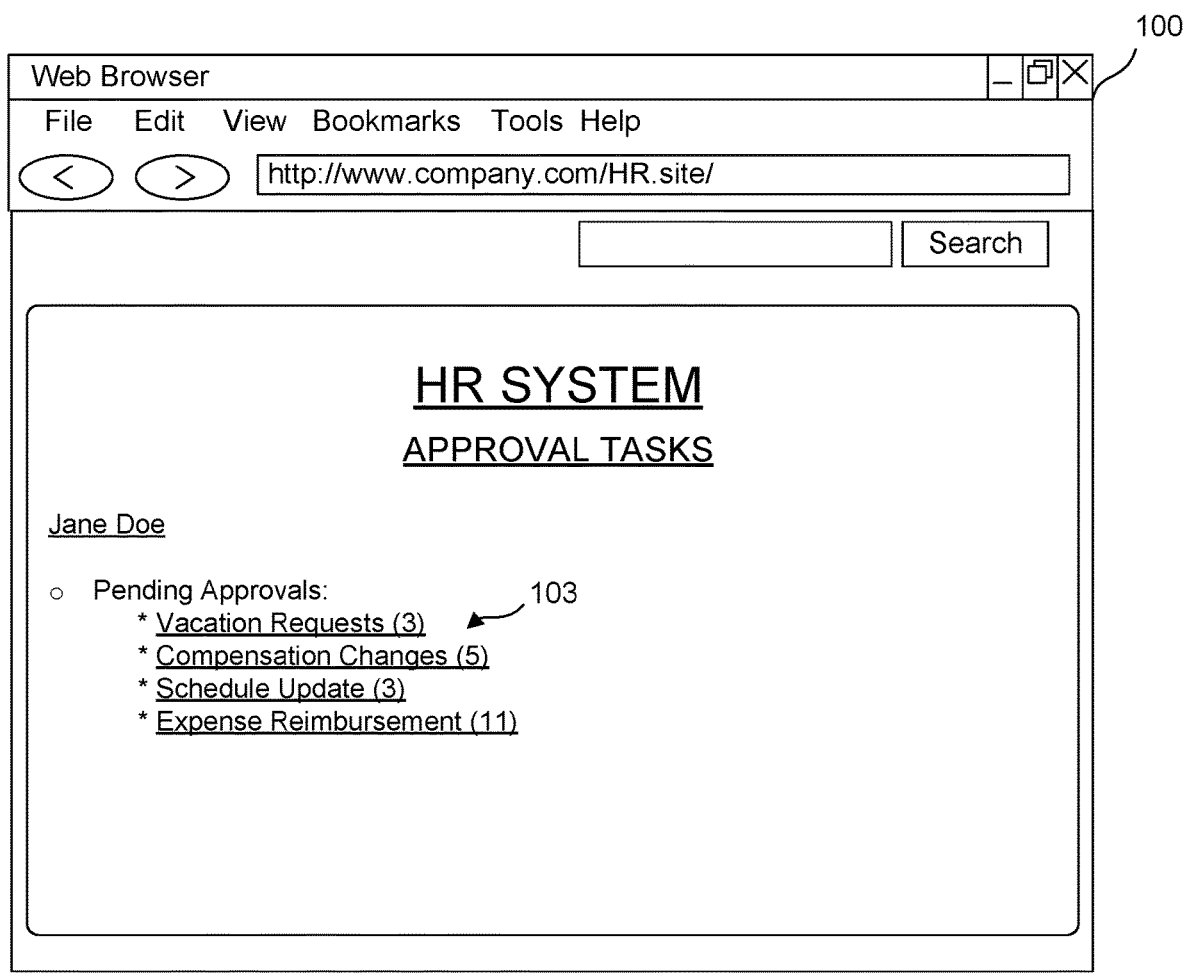
FIGS. 1A-1B illustrate example user interfaces for client devices, according to various embodiments of the present disclosure.

The present disclosure relates to delegating tasks among users in an enterprise. Delegation of tasks can be discretely defined to link a particular action in an enterprise system with a set of temporal restrictions and one or more delegates of a user. Additionally, according to examples of the disclosure, the act of delegating a task to another user can be performed for any action in an enterprise system where a decision is sought from a primary deciding user. In this way, delegation logic need not be built into the logic or process that defines the action. Instead, any action can leverage the generalized delegation logic according to examples of the disclosure to delegate a decision or action in an enterprise application or service.

In many cases, employers have human resources (HR) systems that enable various features. For example, an HR system can allow employees, contractors, or other users associated with an enterprise to perform various HR-related tasks and receive HR services. The HR system can operate as a portal for compensation, vacation, employee benefits, time or attendance tracking, and other services associated with employees and/or contractors of an enterprise.

The HR system can allow to managers or supervisory users to interact with employees and contractors as well as to service various requests on behalf of other users in an organization. For example, the HR system can allow for employees to submit requests for vacation or sick leave. Such a request might be required to be approved or denied by the employee's supervisor or manager. In some cases, a supervisory or managerial user might have a large number of requests that require review and approval or denial. Additionally, the supervisory or managerial user might be unavailable to review the requests. In this scenario, a delegation framework can be desirable that allows delegates of the supervisory user to approve or deny requests on behalf of the user.

Examples of the disclosure provide a delegation framework in which supervisory users can delegate a task requiring a decision to one or more other users in the HR system. The delegation can also include temporal limitations that define a time period during which the other users are authorized to make a decision on behalf of the delegating user. The delegation framework does not allow the other users to log into the HR system as the delegating user. Instead, the delegation framework only permits delegates to make a decision regarding a task but do so under their own respective identifies within the HR system.

Accordingly, the delegating user can define a delegation that identifies one or more delegates as well as the task or action that the delegate is authorized to act upon on behalf of the delegating user. The delegating user can also define a time period during which the delegates are authorized to act on behalf of the delegating user. Examples of the disclosure can provide various user interfaces through which the delegating user and the delegate can access the HR system to setup delegation of a task as well as act upon a delegated task. In the following discussion, a general description of the system and its components is provided, followed by a discussion of the operation of the same.

FIG. 1A is an example of a management user interface 100 for viewing employee profiles. Presently, the management user interface 100 illustrates a user profile for a user, illustrated as the user "Jane Doe." The management user interface 100 can represent a view into an HR system that can be accessed by the user. The user can be associated with a user account within the HR system.

The management user interface 100 can display one or more tasks in a task section 103 and potentially other suitable elements which are not shown and are not necessary for an understanding of examples of the disclosure. The task section 103 can list or categorize the tasks requiring approval or grant by the user. For example, as shown in the example of FIG. 1A, the HR system can generate a user interface that shows the approval tasks that are in a task queue associated with a user account. The task queue can contain the various tasks within the HR system that require review or approval by a user. The task queue can be presented in various ways. In one example, as shown in FIG. 1A, the task queue can be categorized by the type of request. In another example, the task queue can be presented chronologically.

The task section 103 can also provide a visual indicator of how many tasks require review and/or approval by the user. The visual indicator can show a quantity of each category of task that requires action by the user, as shown in the example of FIG. 1A. The user can select one of the categories of tasks from the task section 103 to view the tasks requiring review and approval.

Figure 1B:
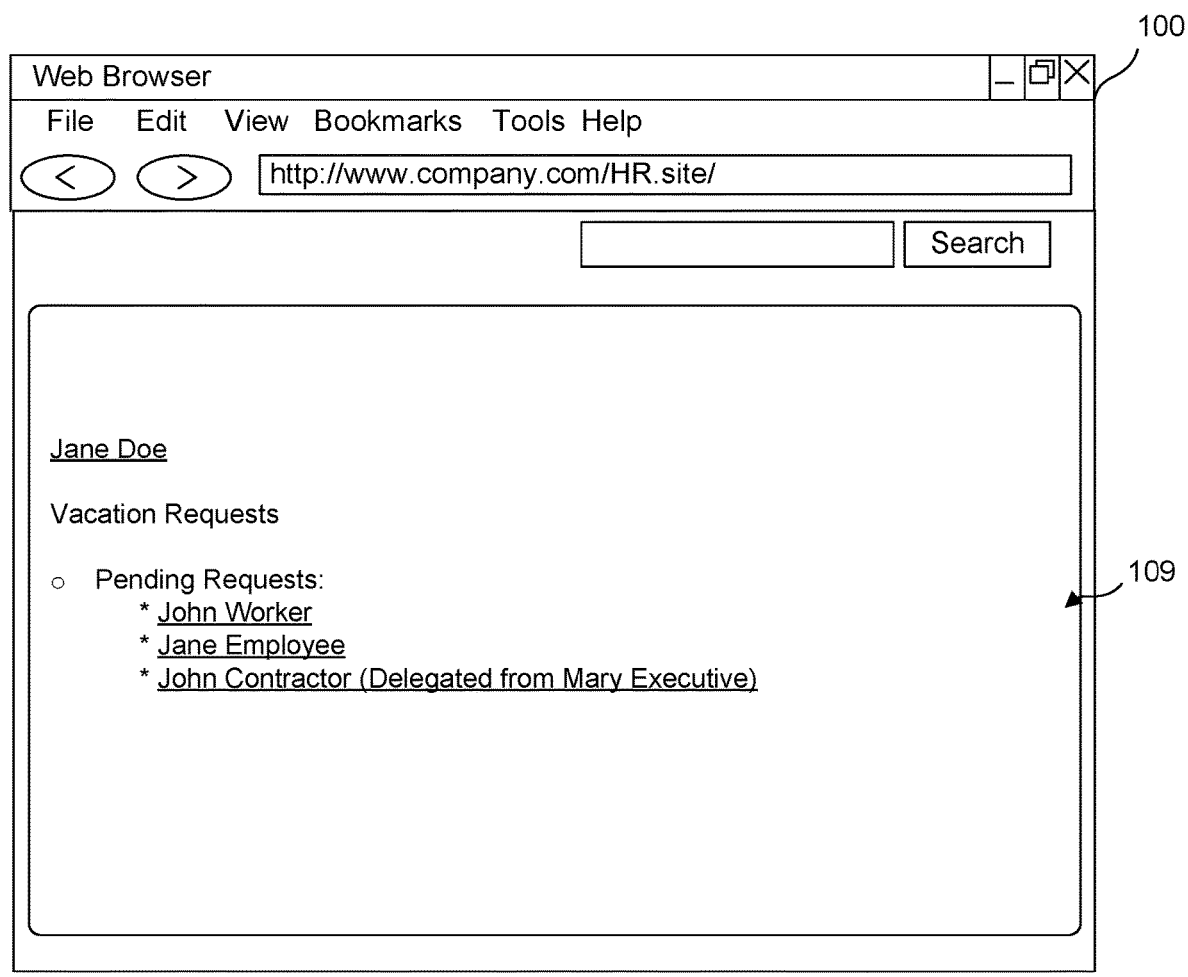

Continuing the example of FIG. 1A, reference is made to FIG. 1B. In the management user interface 100 shown in FIG. 1B, the user has selected one of the categories of tasks from the task section 103 of FIG. 1A. Accordingly, in FIG. 1B, a task list user interface 109 can be shown, which lists the requests that require action by the user. The user can then select a request, review the request, and either approve or deny the request based upon the data within the request.

Accordingly, managing a potentially constant inflow of requests that require review and/or approval by a user can result in a backlog of requests that do not get handled in a timely manner. Therefore, examples of the disclosure can provide a framework for delegation of tasks in an HR system so that users can delegate the authority to approve or deny requests to one or more other users of the HR system. Additionally, examples of the disclosure can allow for temporal restrictions to be placed on the delegation of the authority to approve or deny requests.

Figure 2:
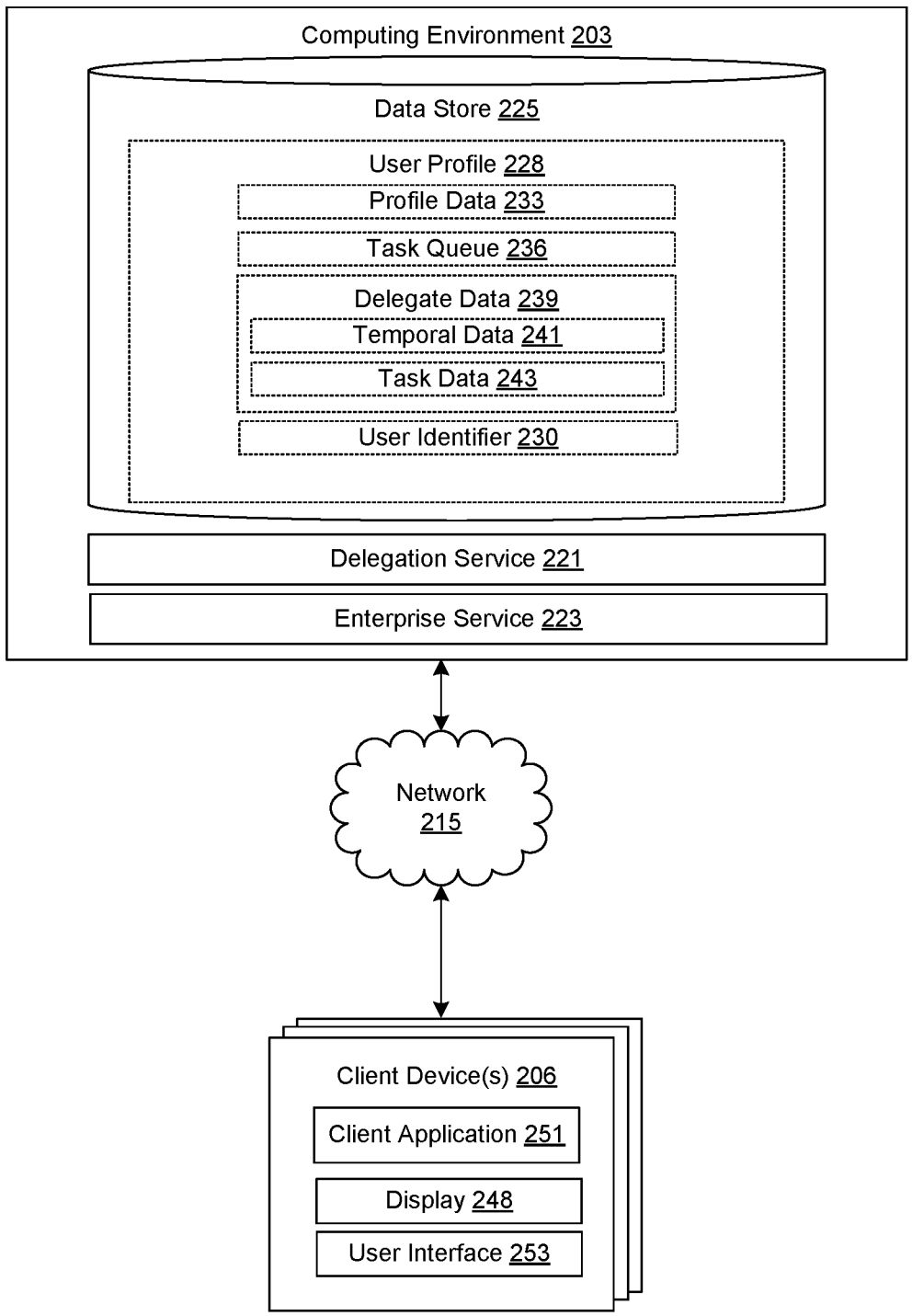
FIG. 2 is a drawing of a networked environment according to various embodiments of the present disclosure.

With reference to FIG. 2, shown is a networked environment 200 according to various embodiments. The networked environment 200 includes a computing environment 203, and one or more client devices 206, which are in data communication with each other via a network 215. The network 215 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 203 may include, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. The components executed on the computing environment 203, for example, may include a delegation service 221, an enterprise service 223, and other applications, services, processes, systems, engines, or functionality not discussed in detail herein. The enterprise service 223 can include, for example, an HR service. The enterprise service 223 can also include other types of network accessible services that can service multiple users over a network 215. For example, the enterprise service 223 can include an email service, an enterprise resource planning (ERP) service, a customer relationship management (CRM) service, or any other type of service that can serve multiple users.

The delegation service 221 can be executed to facilitate delegation of tasks between users of the enterprise service 223. In some examples, the delegation service 221 can represent a standalone service that is separate from the enterprise service 223 or as a module or functionality that is integrated into the enterprise service 223. The delegation service 221 can allow users to define tasks that can be delegated to other users or user groups who are also users of the enterprise service 223. The delegation service 221 can also allow users to specify temporal limitations on the delegation of tasks to other users. In some examples, the delegation service 221 can automatically discover tasks that can be delegated to other users based upon whether a given user is out-of-office or is failing to respond to requests in a timely manner.

Various data is stored in a data store 225 that is accessible to the computing environment 203. The data store 225 may be representative of a plurality of data stores 225 as can be appreciated. The data stored in the data store 225, for example, is associated with the operation of the various applications and/or functional entities described below. In some embodiments, the data store 225 can also represent a search index database for identifying user profiles 228 based at least in part on a search query. For example, the search query can include items (e.g., search criteria) for identifying a user profile stored in the data store 225. The search index data can include an index that associates the user profile 228 with the data associated with the user profile 228. The data stored in the data store 225 includes, for example, user profiles 228, and potentially other data. The user profile 228 can represent a user account for a user at a company. The user profile 228 can include profile data 233, a task queue 236, delegate data 239, a user identifier 230, and other suitable data.

The user identifier 230 can represent a unique identifier for each user profile 228. In some examples, the user identifier 230 can be an alphanumeric character string, a data signature, a device signature, or other suitable identifiers. In some embodiments, the data signature can include a set of unique data for the user (e.g., hire data, social security number, employee number or identifier, residence location, etc.). The device signature for a user can include one or more of an internet protocol (IP) address, a device identifier of a client device 206, a device type, an operating system version, a set of installed applications, and other suitable unique data for a user.

The profile data 233 can represent background information, such as the user's name, title, hiring date, company department, and other suitable information. The profile data 233 can also include a role of a user within an organization or enterprise. The profile data 233 can also include privileges or authorizations associated with the user, such as what applications or services to which the user has access as well as what actions or requests within the profile data 233 that should be sent to the user for review and/or approval.

For example, the profile data 233 can identify a group of users for whom a given user is a manager or supervisor and for whom certain requests should be sent to review. The requests can include vacation requests, requests to edit compensation, a working schedule, a change in employee or contractor status, a change to a role within an organization, or any other request that can be made by or on behalf of another user. In some examples, the enterprise service 223 can rely upon data from a user directory, such as Microsoft ActiveDirectory® in addition to information that can be stored in a user profile 228 to determine a relationship of a given user account to other users within an organization.

In some examples, a profile data 233 can include authentication tokens, credentials, password information, password reset data, certificate data, encryption key data, and other security or authentication-related data that is utilized by the user to access the enterprise service 223 or secure communications between a client device 206 or the user and the enterprise service 223.

The task queue 236 can represent a list or queue of tasks that require action by a given user associated with a user account. In the context of this disclosure, tasks in a task queue 236 can represent requests that are made by or on behalf of other users that require review and approval or denial by a user. For example, a user can submit a request time off to the enterprise service 223. The enterprise service 223 can identify that the request requires approval by one or more other users, such as the user's supervisors or managers. The enterprise service 223 can then create a task that is placed into a task queue 236 or one or more supervisors or managers of the requesting user. The enterprise service 223 can subsequently remove the task from the task queue 236 of the supervisors or managers once the request is either approved or denied.

Delegate data 239 represents information about delegates that are linked to a user account. A delegate of a user is authorized to act upon certain tasks in the task queue 236 of the user. A user can delegate authority to a delegate using user interfaces provided by the enterprise service 223 or the delegation service 221. The delegating user can identify one or more actions or tasks that are delegated to the delegate. The delegating user can also identify temporal data 241 that specifies time restrictions associated with the delegation of an action or task to the delegate. For example, if a delegating user is scheduled to be on vacation during a time period, the delegating user can specify a delegate for a particular task during the time period. In some cases, the temporal data 241 can merely specify a beginning date but not ending date for the delegation of the task. In this scenario, delegation of the task to the delegate can have an indefinite time period.

Task data 243 represents information about a task that can delegated using the delegation service 221. The task data 243 can include a particular action within the 223. In one scenario, the action can be specified with an API call, a callback uniform resource locator (URL), or any other mechanism by which an action can be programmatically identified by the delegation service 221. The task data 243 can also include one or more arguments or options to approve or deny a request associated with the action so that the delegation service 221 determine how to programmatically approve or deny the request. The task data 243 can further include information about how a task can be displayed to a user in a user interface so that the delegation service 221 can facilitate creating a user interface in which a delegate can review and act upon a delegated task.

The client device 206 is representative of one or more client devices 206 that may be coupled to the network 215. The client device 206 may be representative of a client device used by the user and/or a corresponding client devices 206 used by project users. The client device 206 can include any computer system. Examples of computer systems can include a desktop computer, a laptop computer, personal digital assistants, cellular telephones, smartphones, set-top boxes, music players, web pads, tablet computer systems, game consoles, electronic book readers, or other devices with like capability. The client device 206 may include a display 248. The display 248 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 may be configured to execute various applications such as a client application 251 and/or other applications. The client application 251 is executed to facilitate identifying data for storage in the user profile 228 (e.g., task queue 236 and delegate data 239). Additionally, the client application 251 may be executed in a client device 206, for example, to access network content served up by the computing environment 203 and/or other servers, thereby rendering a user interface 253 on the display 248. To this end, the client application 251 may include a browser, a dedicated application, etc., and the user interface may comprise a network page, an application screen, etc. The client device 206 may be configured to execute applications beyond the client application 251 such as, for example, email applications, social networking applications, word processors, spreadsheets, and/or other applications.

A user can authenticate his or her identity with the enterprise service 223 using the client application 251. The enterprise service 223 can provide content to the client application 251, which can include user interfaces through which the user can review, approve, or deny requests in the task queue 236 of the user. Additionally, the enterprise service 223 can transmit notifications to the client device 206 of a user. Notifications can comprise mobile application notifications provided to the client application 251, emails, text messages sent via messaging services, push notifications, or other notifications. Notifications can inform a user that tasks are awaiting to the user in their respective task queue 236 or that a request submitted by or on behalf of a user, such as a vacation request, has been approved or denied by another user with the appropriate authority to do so.

Next, a general description of the operation of the various components of the networked environment 200 is provided. To begin, a user of the enterprise service 223 can utilize client application 251 to access the enterprise service 223 to view tasks in a task queue 236 of the user. The user can be a managerial or supervisory user that accesses an HR system to view requests submitted by or on behalf of other users. The requests should be either approved or denied by the user. In one aspect, the user can review or approve these requests on their own. The user can utilize various user interface workflows provided by the enterprise service 223 to do so.

For example, the user can view a task section 103 of a user interface that shows a task list to identify tasks in the task queue 236 of the user. The user can select one or more tasks to review the details associated with a task. The user can then review and either approve or deny a request associated with a task.

In some examples, the user can also set up delegation of a task to one or more other users. A task can be delegated to a user or a user group. A user can be identified using a user identifier within the enterprise service 223 such as an email address, user ID, or other identifier. A user group can also be identified within the enterprise service 223 using a group email address, group identifier, multiple user identifiers, or other identifier that can be used to identify a user group.

The user can also specify temporal data 241 that can be associated with delegation of a task. The temporal data 241 specifies time restrictions associated with the delegation of an action or task to the delegate. For example, if a delegating user is scheduled to be on vacation during a time period, the delegating user can specify a delegate for a particular task during the time period. In some cases, the temporal data 241 can merely specify a beginning date but not ending date for the delegation of the task. In this scenario, delegation of the task to the delegate can have an indefinite time period.

Specifying temporal data 241 can be considered optional if a user wishes to indefinitely delegate a task to another user.

Once delegation of a task is setup by a user, the delegation service 221 can add tasks associated with a request submitted by or on behalf of a requesting user to a task queue 236 of the delegating user as well as the delegates specified by the delegating user. As the task is acted upon by the delegating user or the delegates, the task can be removed from the task queue 236 of the delegates and the delegating user.

Additionally, the delegation service 221 or enterprise service 223 can generate notifications that can be sent to the delegates, as well as the delegating user, when a request submitted by or on behalf of a requesting user is received by the enterprise service 223. Notifications can comprise mobile application notifications provided to the client application 251, emails, text messages sent via messaging services, push notifications, or other notifications. Notifications can inform a user that tasks are awaiting to the user in their respective task queue 236 or that a request submitted by or on behalf of a user, such as a vacation request, has been approved or denied by another user with the appropriate authority to do so.

Turning now to FIG. 3A, shown is a delegation user interface 301 in which a user can view, edit, and add delegates for various types of tasks. As shown in the delegation user interface 301, a user can define another user as a delegate. The delegate user can be identified by a user identifier within the enterprise service 223, such as an email address of the delegate user. The delegating user can further specify temporal restrictions associated with the delegate. The temporal restrictions can include a start date and an end date of delegation of a specified action. In some examples, the temporal data 241 can specify a particular time of the day in addition to the dates.

Finally, as shown in FIG. 3A, the delegating user can identify one or more actions that can be delegated to the user. The actions can be selected by the user using the delegation user interface 301 generated by the enterprise service 223 or delegation service 221. In the example shown, multiple actions can be delegated to the delegate by the delegating user. The actions can both be associated with the temporal data 241 specified by the delegating user. In one implementation, multiple entries for each delegated action can be created within the delegate data 239. In another example, a single entry specifying multiple actions can be created within the delegate data 239.

In some examples, delegations can be automatically created by obtaining an out of office status of a user. For example, if a user can designate an out of office status, the delegation service 221 can automatically select a delegate for one or more tasks associated with the user based upon a previous delegation of the one or more tasks. In this scenario, if a user has previously delegated a task to another user or user group, the delegation service 221 can automatically create a delegation of the task to the same other user or user group if the user is designated as out of office or unavailable. The out of office or unavailability status of the user can be detected from a user directory service or from another data point from the enterprise service 223, such as in an HR system directory. In another scenario, the other user or user group to whom a task is delegated can be selected by navigating a user directory to locate a supervisor of the user or a subordinate of the user.

Figure 3B:
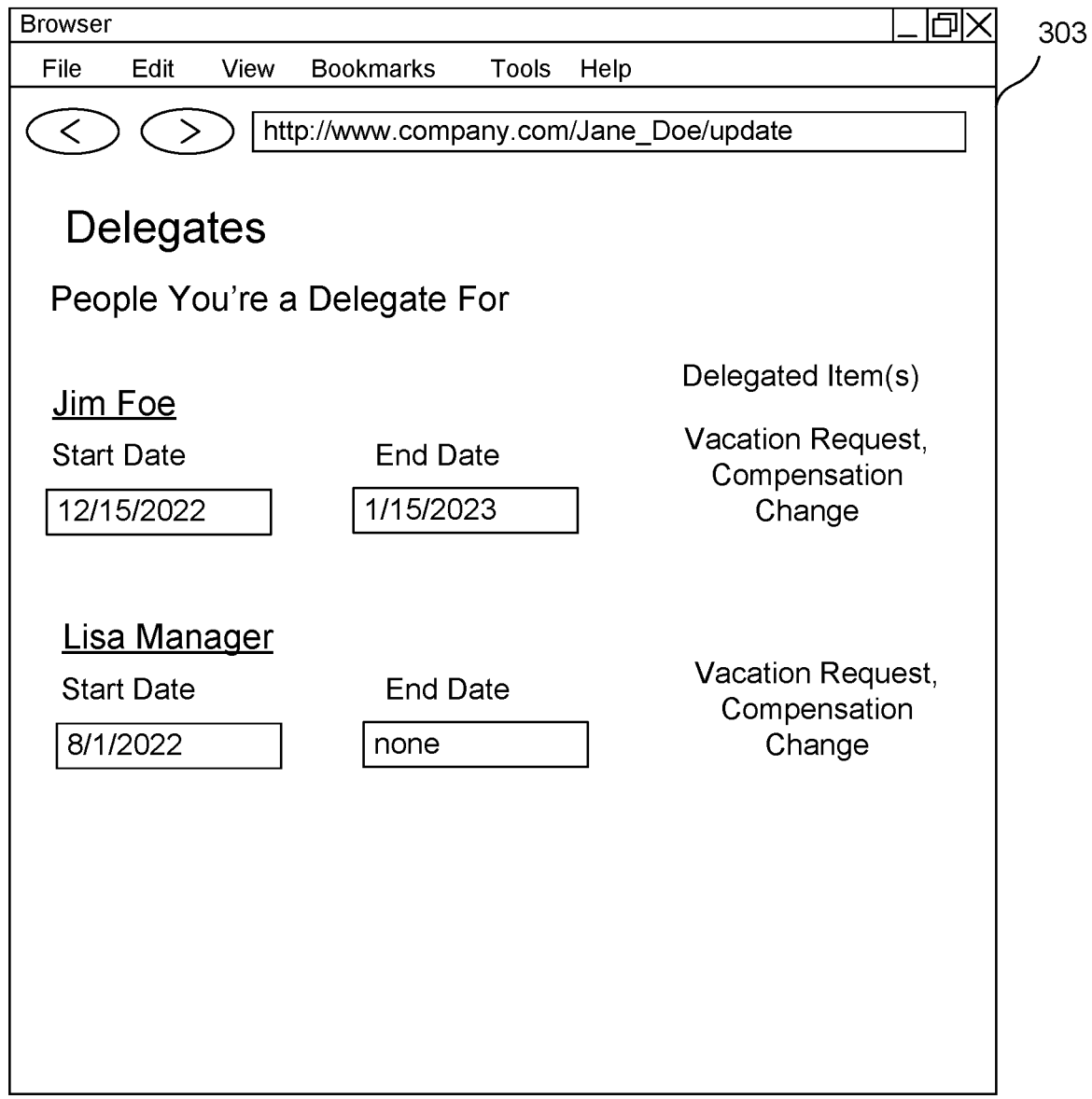

Moving on to FIG. 3B, shown is a delegate user interface 303 that can be rendered on the client device 206. The delegate user interface 303 can be generated by the delegation service 221 or enterprise service 223 to display delegations that have been given to a delegate. As shown in the delegate user interface 303, the enterprise service 223 or delegation service 221 can indicate an identity of a delegating user who has delegated one or more tasks to the delegate. Additionally, the delegate user interface 303 can display temporal restrictions associated with each delegation. The temporal restrictions can include a start date and an end date of delegation of a specified action. Finally, as shown in FIG. 3B, the delegate user interface 303 can display the one or more actions that have been delegated to the user. The actions can be selected by the user using the delegation user interface 301 of FIG. 3A.

Figure 3C:
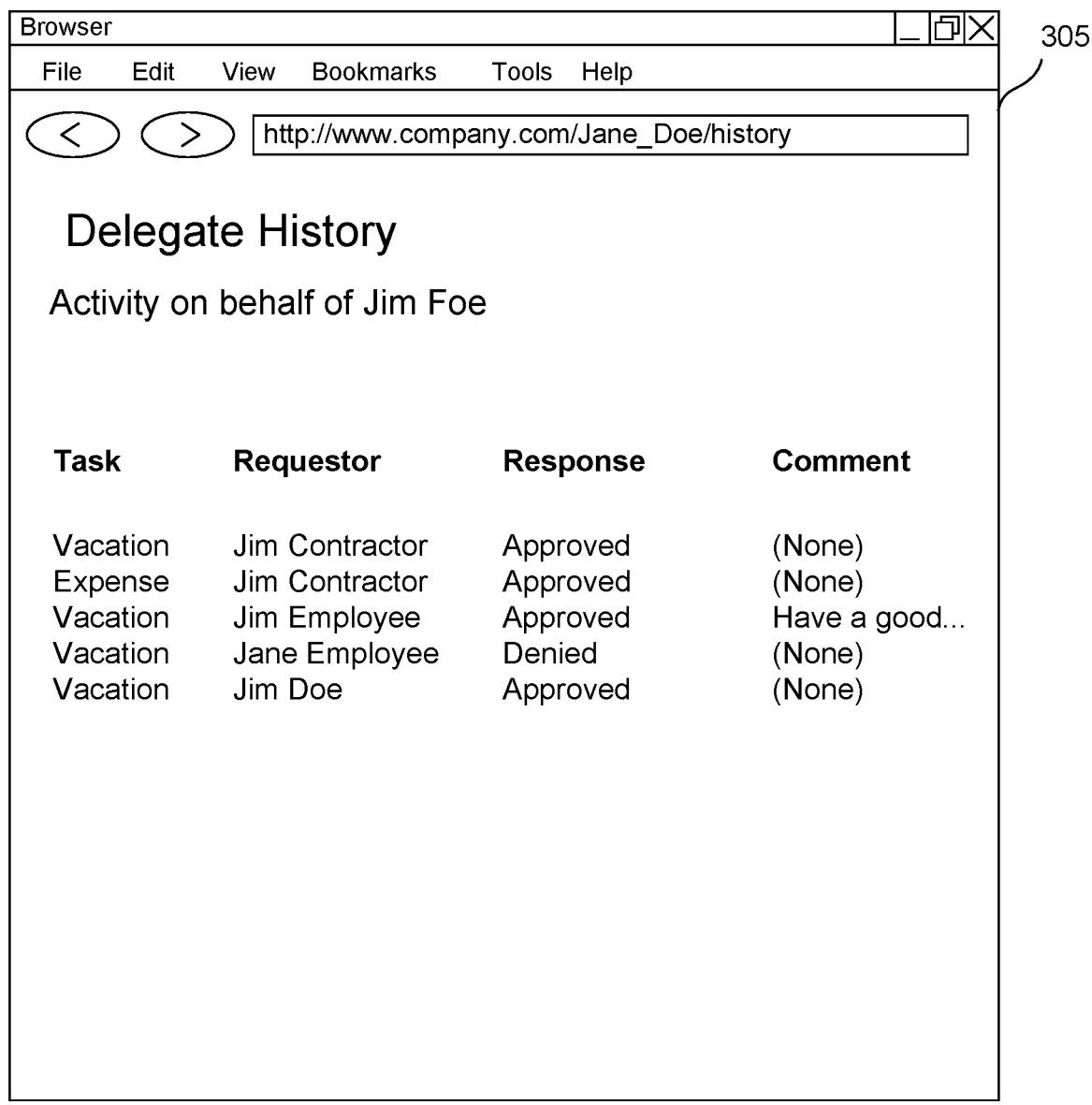

Moving on to FIG. 3C, shown is a delegate history user interface 305 that can be rendered on the client device 206. The delegate history user interface 305 can be generated by the delegation service 221 or enterprise service 223 to display an activity history of a user as a delegate. As shown in the delegate history user interface 305, the enterprise service 223 or delegation service 221 can display a history of previous approvals or denials made on behalf of a delegating user.

Figure 3D:

Moving on to FIG. 3D, shown is a request result user interface 307 that can be rendered on the client device 206. The request result user interface 307 can be generated by the delegation service 221 or enterprise service 223 to display a result of a request that was handled by a supervisory user or manager of a requesting user. In some examples, the request can be handled by a delegate of the supervisory user or manager. Accordingly, the request result user interface 307 can indicate that the request was handled by a delegate of the supervisory user or manager.

Figure 4:
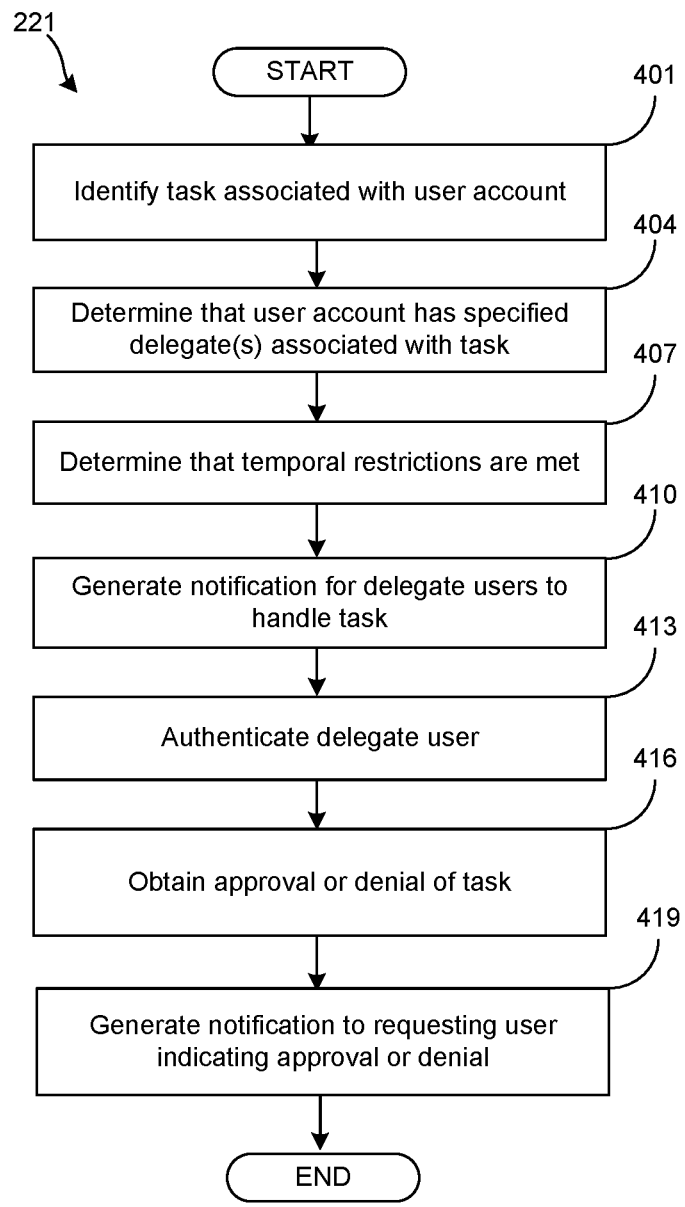
FIG. 4 is a flowchart illustrating one example of functionality implemented as portions of a delegation service executed in a computing environment in the networked environment of FIG. 2 according to various embodiments of the present disclosure.

Referring next to FIG. 4, shown is a flowchart that provides one example of the operation of a portion of the delegation service 221 according to various embodiments. It is understood that the flowchart of FIG. 4 provides merely an example of the many different types of functional arrangements that may be employed to implement the operation of the portion of the delegation service 221 as described herein. As an alternative, the flowchart of FIG. 4 may be viewed as depicting an example of elements of a method implemented in the computing environment 203 (FIG. 2) according to one or more embodiments. The functionality shown in FIG. 4 can also be performed by the enterprise service 223 in some examples.

Beginning with box 401, the delegation service 221 can identify a task associated with a user of the enterprise service 223. The task can be associated with a request made by another user that requires approval or denial by the user. The task can be obtained from a task queue 236 of the user by the delegation service 221. For example, the task can be associated with a request for vacation, a change in compensation, a change to a working schedule, or any other request that can be made using the enterprise service 223.

At step 404, the delegation service 221 can determine that the user account has delegated the task to one or more delegate users. The delegation service 221 can make this determination by consulting delegate data 239 associated with the user account. The delegate data 239 can indicate which tasks of a user have been delegated and to which other users of the enterprise service 223. Accordingly, the delegation service 221 can determine whether the characteristics of the request associated with the task, including a request type, are consistent with the delegate data 239 associated with the user account.

At step 407, the delegation service 221 can determine that a timestamp associated with the request linked to the task falls within a start date and end date specified in the temporal data 241. The temporal data 241 specifies whether the task is delegated during a timestamp associated with the request.

At step 410, the delegation service 221 can generate a notification that can be transmitted to the delegates identified by the delegate data 239. The notification can inform the delegates that a delegated task requires action by the delegate. The notification can be sent via email, messaging, a mobile app notification, or through any suitable notification framework.

At step 413, the delegation service 221 can authenticate a delegate user that has responded to the notification by attempting to take action on the request. The delegation service 221 can verify that the delegate user is authenticated with the delegation service 221 as well as verify that the delegate user is a delegate for the task.

At step 416, the delegation service 221 can obtain an approval or denial of the request associated with the task. The approval or denial can be obtained through a user interface provided by the delegation service 221 to the delegate user.

At step 419, once the delegate user approves or denies the request associated with the task, the delegation service 221 can generate a notification informing the subject user associated with the request. The notification can include an indication of whether the request was approved or denied. The notification can also include an indication of the identity of the delegate user that approved or denied the request. Thereafter, the process can proceed to completion.

A number of software components are stored in the memory and are executable by the processor. In this respect, the term "executable" means a program file that is in a form that can ultimately be run by the processor. Examples of executable programs may be, for example, a compiled program that can be translated into machine code in a format that can be loaded into a random access portion of the memory and run by the processor, source code that may be expressed in proper format such as object code that is capable of being loaded into a random access portion of the memory and executed by the processor, or source code that may be interpreted by another executable program to generate instructions in a random access portion of the memory to be executed by the processor, etc. An executable program may be stored in any portion or component of the memory including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory is defined herein as including both volatile and nonvolatile memory and data storage components. Volatile components are those that do not retain data values upon loss of power. Nonvolatile components are those that retain data upon a loss of power. Thus, the memory may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor may represent multiple processors and/or multiple processor cores and the memory may represent multiple memories that operate in parallel processing circuits, respectively. In such a case, the local interface may be an appropriate network that facilitates communication between any two of the multiple processors, between any processor and any of the memories, or between any two of the memories, etc. The local interface may comprise additional systems designed to coordinate this communication, including, for example, performing load balancing. The processor may be of electrical or of some other available construction.

Although the applications described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 4 shows the functionality and operation of an implementation of portions of various embodiments of the present disclosure. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device, or in multiple computing devices in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X; Y; Z; X and/or Y; X and/or Z; Y and/or Z; X, Y, and/or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
a computing device comprising a processor and a memory; and
machine-readable instructions stored in the memory that, when executed by the processor, cause the computing device to at least:
receive, from a first device remote from the computing device, via a network using a secure communication channel, a first request to approve a task associated with a first account identifier;
determine, based on an account profile for the first account identifier, that the first account identifier is associated with a second account identifier;
retrieve, from a database, data associated with the second account identifier, the data including one or more tasks linked with the second account identifier;
append, responsive to retrieval of the data, the task to the data such that the task is included in the one or more tasks;
cause a second device, associated with the second account identifier, to generate a first graphical user interface that includes a first notification of the task;
receive, from the second device, information that includes (1) a device signature associated with the second device and (2) an authentication token of the second account identifier;
authenticate the second device in response to receipt of the information;
cause, responsive to authentication of the second device, the second device to generate a second graphical user interface that includes a second notification with a second request for approval of the task;
control, responsive to receipt of the approval of the task, execution of an application stored on the second device to cause the second device to perform one or more actions associated with implementation of the task; and
truncate, responsive to performance of the one or more actions, the data to remove the task from the one or more tasks.

2. The system of claim 1, wherein the second notification includes an indication to delegate the task, wherein the indication is associated with temporal data, and wherein the temporal data indicates a time period during which the task is delegated to at least one other account identifier.

3. The system of claim 2, wherein the machine-readable instructions, when executed by the processor, further cause the computing device to:
generate a third graphical user interface for the first device to define the temporal data associated with the task.

4. The system of claim 3, wherein the third graphical user interface comprises a selection component configured to receive a selection of the at least one other account identifier.

5. The system of claim 1, wherein the machine-readable instructions, when executed by the processor, further cause the computing device to:
generate a third graphical user interface for a third device associated with at least one other account identifier.

6. The system of claim 1, wherein the machine-readable instructions, when executed by the processor, cause the computing device to:
define a delegation of the task by identifying the one or more actions associated with implementation of the task;
obtain a selection of at least one other account identifier for which the task is delegated to; and
associate the delegation of the task with the at least one other account identifier.

7. A method, comprising:
receiving, by a computing device, from a first device remote from the computing device, via a network using a secure communication channel, a first request for approval of a task associated with a first account identifier;

determining, by the computing device, based on an account profile for the first account identifier, that the first account identifier is associated with a second account identifier;

retrieving, by the computing device, from a database, data associated with the second account identifier, the data including one or more tasks linked with the second account identifier;

appending, by the computing device, responsive to retrieval of the data, the task to the data such that the task is included in the one or more tasks;

causing, by the computing device, a second device, associated with the second account identifier, to generate a first graphical user interface that includes a first notification of the task;

receiving, by the computing device, from the second device, information that includes (1) a device signature associated with the second device and (2) an authentication token of the second account identifier;

authenticating, by the computing device, the second device in response to receiving the information;

causing, by the computing device, responsive to authentication of the second device, the second device to generate a second graphical user interface that includes a second notification with a second request for approval of the task;

controlling, by the computing device, responsive to receiving the approval of the task, execution of an application stored on the second device to cause the second device to perform one or more actions associated with implementation of the task; and truncating, by the computing device, responsive to performance of the one or more actions, the data to remove the task from the one or more tasks.

8. The method of claim 7, wherein the second notification includes an indication to delegate the task, wherein the indication is associated with temporal data, and wherein the temporal data indicates a time period during which the task is delegated to at least one other account identifier.

9. The method of claim 8, further comprising:
generating, by the computing device, a third graphical user interface for the first device to define the temporal data associated with the task.

10. The method of claim 9, wherein the third graphical user interface comprises a selection component configured to receive a selection of the at least one other account identifier.

11. The method of claim 7, further comprising:
generating, by the computing device, a third graphical user interface for a third device associated with at least one other account identifier.

12. The method of claim 7, further comprising:
defining, by the computing device, a delegation of the task by identifying the one or more actions associated with implementation of the task;
obtaining, by the computing device, a selection of at least one other account identifier for which the task is delegated to; and
associating, by the computing device, the delegation of the task with the at least one other account identifier.

13. One or more non-transitory storage media storing instructions thereon that, when executed by one or more processors, cause the one or more processors to perform operations comprising:

receiving, from a first device, via a network, using a secure communication cannel, a first request for approval of a task associated with a first account identifier;

determining, based on an account profile for the first account identifier, that the first account identifier is associated with a second account identifier;

retrieving, from a database, data associated with the second account identifier, the data including one or more tasks linked with the second account identifier;

appending, responsive to retrieving the data, the task to the data such that the task is included in the one or more tasks;

causing a second device, associated with the second account identifier, to generate a first graphical user interface that includes a first notification of the task;

receiving, from the second device, information that includes (1) a device signature associated with the second device and (2) an authentication token of the second account identifier;

authenticating the second device in response to receiving the information;

causing, responsive to authenticating the second device, the second device to generate a second graphical user interface that includes a second notification with a second request for approval of the task;

controlling, responsive to receiving the approval of the task, execution of an application stored on the second device to cause the second device to perform one or more actions associated with implementation of the task; and truncating, responsive to performance of the one or more actions, the data to remove the task from the one or more tasks.

14. The one or more non-transitory storage media of claim 13, wherein the second notification includes an indication to delegate the task, wherein the indication is associated with temporal data, and wherein the temporal data indicates a time period during which the task is delegated to at least one other account identifier.

15. The one or more non-transitory storage media of claim 14, wherein the instructions, further cause the one or more processors to perform operations comprising:
generating a third graphical user interface for the first device to define the temporal data associated with the task.

16. The one or more non-transitory storage media of claim 13, wherein the instructions, further cause the one or more processors to perform operations comprising:
generating a third graphical user interface for a third device associated with at least one other account identifier.

17. The one or more non-transitory storage media of claim 13, wherein the instructions, further cause the one or more processors to perform operations comprising:
defining a delegation of the task by identifying the one or more actions associated with implementation of the task;
obtaining a selection of at least one other account identifier for which the task is delegated to; and
associating the delegation of the task with the at least one other account identifier.

* * * * *